INVENTOR.
RICHARD D. EDDY

BY *Albert L. Jeffers*

ATTORNEY

INVENTOR.
RICHARD D. EDDY
BY Albert L. Jeffers
ATTORNEY

United States Patent Office 3,233,180
Patented Feb. 1, 1966

3,233,180
FREQUENCY COMPARATOR

Richard D. Eddy, Fort Wayne, Ind., assignor to Bowser, Inc., Fort Wayne, Ind., a corporation of Indiana Filed Dec. 13, 1961, Ser. No. 159,001
8 Claims. (Cl. 328—134)

The present invention relates generally to frequency comparators, and more particularly relates to a frequency comparator utilizing digital techniques.

As an overall object, the present invention provides a frequency comparator which can be reproduced in production without matching component values in a plurality of signal channels, thereby allowing the use of standard components. As is known, conventional frequency comparators for detecting a frequency difference between two separate signals require expensive matching of components in a plurality of channels for each received signal. Other items adding to the expense of the circuitry of conventional frequency comparators are delay lines and potentiometers. As will be seen, the present invention eliminates these and other disadvantages of prior art comparators.

Another object of the present invention is to provide a frequency comparator which is compact, light in weight, and reliable through the use of static devices requiring little or no maintenance.

Still another object of the present invention is to provide a frequency comparator utilizing static elements which permit greater accuracy, improved reliability and sensitivity, and which require considerably less space than conventional frequency comparators.

Further objects and advantages of the present invention will be readily apparent from the following detailed description taken in conjunction with the accompanying drawings, in which.

The frequency comparator in accordance with the present invention is used to detect a frequency difference between two separate input signals herein illustrated to be two separate pulse trains. Of course, should the two separate signals each be alternating or otherwise, then conventional pulse forming circuitry (not illustrated) may provide a pulse train for each signal in accordance with the information transmitted. When the two pulse train signals to be compared are applied to the frequency comparator of the present invention, a signal having a frequency equal to the frequency difference of the two pulse trains will appear at an appropriate output. For instance, if a pulse train of 1500 pulses per second and a pulse train of 1250 pulses per second are applied to the frequency comparator, then 250 pulses per second will appear at appropriate output means in accordance with the pulse train of higher frequency.

Figure 1:
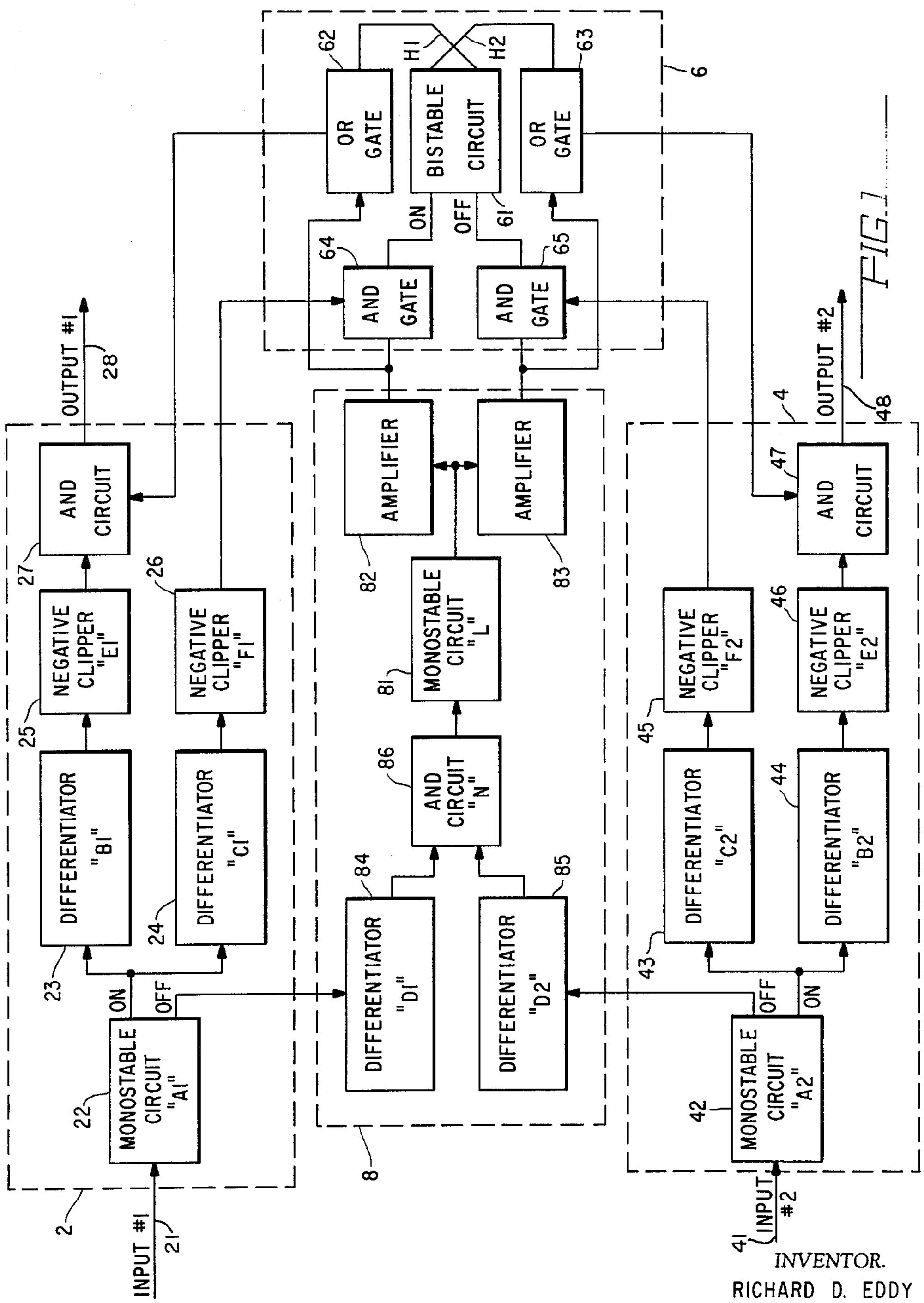
FIGURE 1 is a block diagram of an illustrative embodiment of the invention.

Broadly, the frequency comparator is illustrated in FIG. 1 as comprising a first channel 2 for the first input pulse train, a second channel 4 for the second input pulse train, a flip-flop section 6 for selectively gating an output signal from each of the channels and a coincident pulse senseing section 8 for blocking an output signal from either channel when an input pulse appears simultaneously at each channel.

More specifically, the first channel 2 comprises monostable means including input means 21 and a monostable multivibrator 22 having an ON output and an OFF output. The monostable multivibrator 22 is selected to have one stable state. The mutlivibrator transfers with the application of an input pulse to its associated input means 21 to its unstable state which provides a rectangular pulse at the ON output, but returns to its original stable state after a length of time predetermined by the selection of the circuit constants. The normally ON output is connected to differentiating means illustrated as differentiator 23 and differentiator 24 connected in parallel circuit relationship. Each differentiator has an associated negative clipper 25 and 26, respectively. The negative clippers 25 and 26 are selected to block the spiked pulse signals of one polarity but allow passage of pulse signals of the opposite polarity. Finally, the first channel also comprises an associated output circuit including an AND gate 27 and output means 28.

Similarly, the second channel 4 comprises monostable means including input means 41 and a second monostable multivibrator 42 having an ON output and an OFF output. Second differentiating means is operably connected to the ON output of the monostable multivibrator 42 and comprises the parallel connection of differentiators 43 and 44 and clippers 45 and 46. Output circuitry for the second channel 4 includes another or second AND gate 47 and its output means 48.

In order to selectively enable the AND gates 27 and 47 to gate an output signal at the output means 28 or 48, the flip-flop section 6 is chosen to enabel the AND gate 27 and disabel the AND gate 47 when in a certain state and to enable the AND gate 47 and disable the AND gate 27 when the state of the flip-flop section 6 is reversed.

More particularly, a bistable multivibrator 61, also referred to as a "flip-flop," has two stable states or outputs, indicated as H1 and H2. To control the output of the flip-flop 61, two inputs are provided thereto and arbitrarily referred to as ON and OFF. Only one output can be present at a given time. The flip-flop provides an output in accordance with the last received input thereto. In response to a first input, the flip-flop element 61 produces an output which is maintained even though the first input thereafter is discontinued. The flip-flop is reset, or the states reversed, in response to a second or OFF input.

As can be sen from the drawing, an OR gate 62 has one input thereto connected to the output H1 of the flip-flop 61 and an OR gate 63 has one input thereto connected to the output H2 of the flip-flop 61. The OR gates 62 and 63 provide an enabling signal to their associated AND gates 27 and 47, respectively, depending upon which of the outputs H1 or H2 is energized by the flip-flop 61 and further depending upon the presence of an enabling signal to the OR gates 62 and 63 from the coincident pulse sensing section 8, as will be described in further detail hereinafter.

The ON input and the OFF input to the flip-flop 61 are energized by an AND gate 64 and an AND gate 65, respectively. Hence, the ON input to the flip-flop 61 will be energized providing an input results to the AND gate 64 from the first channel 2 and providing an enabling signal which is also present from the coincident pulse sensing section 8 as will be described in further detail hereinafter. In a like manner, the AND gate 65 will energize the OFF input to the flip-flop 61 upon receipt of an input pulse signal from the second channel 4 providing an enabling signal which is also present from the coincident pulse sensing section 8, as will also be described in further detail hereinafter.

In operation, assuming the input pulse train is fed into the first channel 2 only, the monostable multivibrator 22 transfers to its unstable ON state upon receipt of each individual pulse at its associated input means 21. The ON output feeds the two differentiating circuits 23 and 24. The differentiating circuits 23 and 24 resolve the rectangular wave output of the monostable multivibrator appearing at the ON output into two spiked pulse signals of opposite polarity and spaced in time according to the time delay T1 of the monostable multivibrator 22. The negative clippers 25 and 26 block the spiked pulse signals (chosen to be illustrated as of negative polarity) that are produced when the monostable multivibrator switches to the unstable state and passes the pulse signals (chosen to be illustrated as of positive polarity) that are produced when the monostable multivibrator 22 switches back to its stable state. Therefore, clipper 26 feeds the pulse signal of opposite polarity to the AND gate 64 of the flip-flop section 6. The AND gate 64 provides the pulse signal at the ON input of the flip-flop 61 thereby causing the flip-flop 61 to change output states and accordingly enable the AND gate 27 by way of the OR gate 62. All pulses occurring in the pulse train that enters the first channel 2 after the AND gate 27 is enabled, will appear at the output means 28 of the first channel 2.

With an input pulse train applied to the second channel 4 only, the response is identical to that of the first channel 2 described previously, since the components of the second channel 4 are selected to be similar to those in the first channel 2. The first pulse of the second pulse train entering the second channel 4 will change the output state of the flip-flop 61 to enable its AND gate 47. All succeeding pulses that enter the second channel 4 will appear at the output means 48 of the second channel 4.

With alternate pulses to the first channel 2 and the second channel 4, the output from each channel will be zero because the pulses will be used to alternately change the output state of the flip-flop 61. For instance, a pulse entering the first channel 2 will condition the flip-flop 61 to enable the AND gate 27 and the next pulse will enter the second channel 4 which will reverse the condition of the flip-flop 61 to enable the AND gate 47. Such action will continue indefinitely as the alternate pulses are applied to the first and second channels 2 and 4.

It was mentioned previously that the coincident pulse sensing section 8 is assumed to be providing an enabling signal to the AND gates 64 and 65 and the OR gates 62 and 63 of the flip-flop section 6. However, should a pulse from each pulse train appear simultaneously at its associated channel 2 or 4, a disabling signal will be provided by the coincident pulse sensing section 8 to the AND gates and OR gates of the flip-flop section 6, thereby rendering the AND gate 27 and the AND gate 47 of the first and second channels 2 and 4, respectively, inoperative.

Referring more particularly to the coincident pulse sensing section 8, a monostable multivibrator 81 is selected to have a stable state resulting in an enabling signal therefrom. Upon application of an input pulse to the monostable multivibrator 81, it assumes an unstable state for a time duration T2, which time duration T2 is selected to be longer than the time duration T1 of the unstable state assumed by the previously mentioned monostable multivibrators 22 and 42. The unstable output state of the monostable multivibrator 81 provides a disabling signal for the time duration T2.

The output of the monostable multivibrator 81 is amplified by amplifiers 82 and 83 for connection to the gates 64 and 62 as well as the gates 65 and 63, respectively.

To provide an input pulse signal to the monostable multivibrator 81, a differentiator 84 is connected to the OFF output of the first monostable multivibrator 22 and a differentiator 85 is connected to the OFF output of the second monostable multivibrator 42. The differentiators 84 and 85 operate in a similar manner to the differentiators previously mentioned; namely, producing a pulse signal of one polarity when the output pulse from the monostable multivibrator is rising and producing a pulse signal of opposite polarity when the retangular pulse is falling or ceasing.

Each output from the differentiators 84 and 85 is then connected to an AND gate 86 which, in turn, provides an input to the monostable multivibrator 81 upon the simultaneous occurrence of inputs to the AND gate 86.

Figure 2:
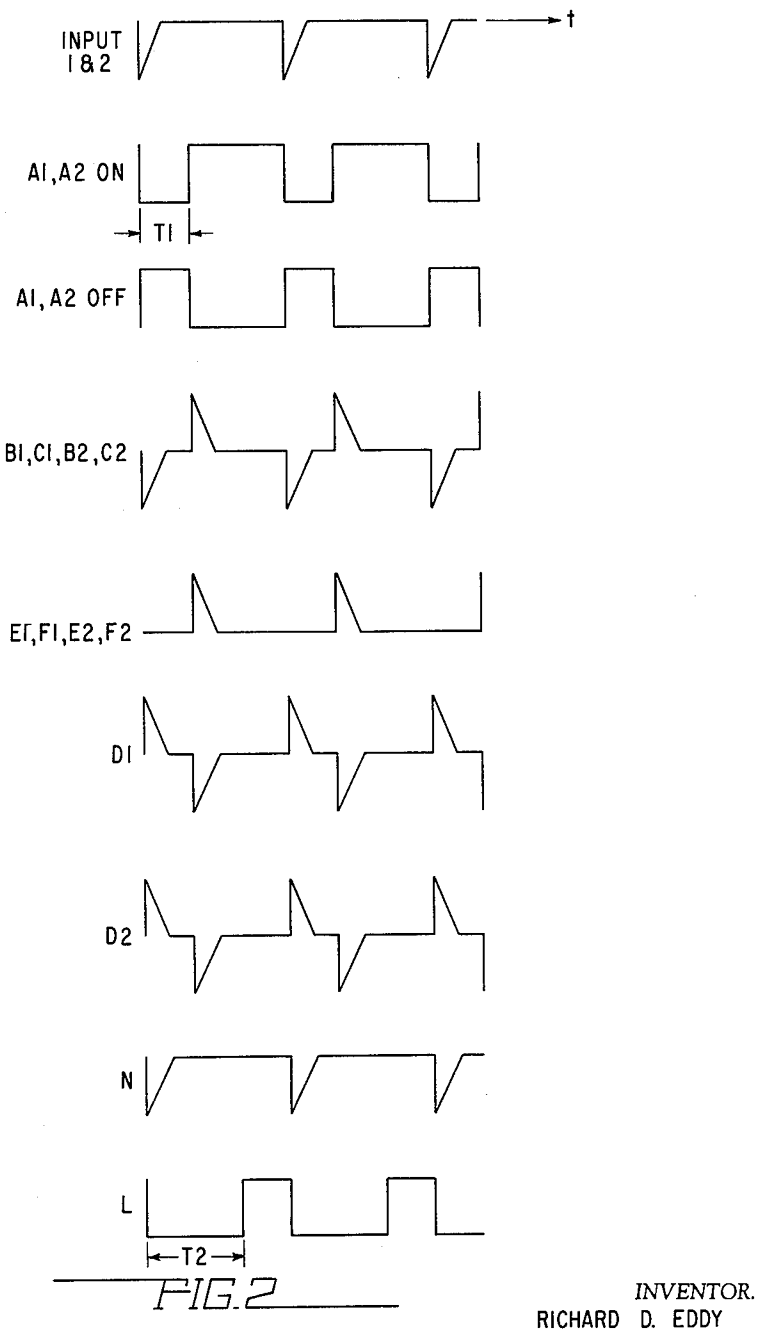
FIG. 2 illustrates certain wave forms useful in understanding the operation of the illustrative embodiment shown in FIG. 1.

With coincident pulses to the first channel 2 and the second channel 4, the function of the circuit can be more readily understood by reference to FIG. 2. FIG. 2 illustrates various wave forms resulting from particlar components of the frequency comparator. For this reason, selected components of the comparator have been given a letter designation to provide ease of understanding when considering the wave forms presented in FIG. 2. Where the wave form outputs are similar and can be readily grouped they are illustrated together.

It is to be recalled that the operation of the circuitry under consideration is the last remaining operational consideration; namely, coincident pulses to the first channel 2 and the second chanel 4. For instance, input 1 and input 2 appear simultaneously at their associated channels 2 and 4, respectively.

In this case, the two monostable multivibrators 22 and 42 will be in the unstable state A1 and A2 ON respectively at the same instant and both assume the unstable state A1 and A2 OFF respectively at time T1 later. This will cause the differentiators 84 and 85 to produce pulse signals D1 and D2 at the same time. However, only the pulse signals of opposite polarity (illustrated as positive) are operative to gate a signal from the AND gate 86. It is to be noted that these pulse signals occur in point of time prior to the pulse signals of similar polarity E1, F1, E2, F2 resulting to the AND gates 64 and 65 and the AND gates 27 and 47. The AND gate 86 of the coincident pulse sensing section 8 will detect N the coincidence of pulse signals from the differentiators 84 and 85 and trigger the monostable multivibrator 81 to the unstable state L. As stated previously, when monostable multivibrator 81 is in its unstable state, it produces a disabling signal. That is, it disables the AND gates 64 and 65 by the removal of the enabling signal thereto and disables the AND gates 27 and 47 by similar action through the OR gates 62 and 63. The delay time T2 of the monostable multivibrator 81 is longer than the delay time T1 of the monostable multivibrators 22 and 42. The pulse signals of the one polarity E1, F1, E2, F2 and which it will be recalled are produced upon the ON rectangular pulse from the first and second multivibrators ceasing, are washed out. That is, they will not affect or alter the state of the flip-flop 61 nor appear at either output means 28 or 48 since the AND gates 64 and 65 to the flip-flop 61 and the AND gates 27 and 47 to the output means are disabled by the monostable multivibrator 81 for a time period T2 selected to be greater than the time period T1.

Thus, it is readily apparent that the present invention provides a frequency comparator utilizing signal techniques thereby eliminating balancing of the channels by a potentiometer and delay lines necessary in conventional frequency comparators. Delay is accomplished in the present invention by the inherency of delay in the monostable multivibrators. The gates 27, 62 and 63 and 47 are preferably of the diode type rather than the transistor type. This is particularly advantageous in that the circuits are more stable and accuracy is greater because spurious signals occurring in the channels 2 and 4 may falsely open gates of the transistor type. Diode gates would not be opened by minor surges or pulses of an extraneous nature. When desirable, the output pulses of the pulse comparator circuit appearing at the output means 28 and 48 may be directed to a limiting circuit, then to an amplifier circuit, and hence to a driving means such as a motor to open or close a valve or any other desirable operation.

While the present invention has been described with a degree of particularity for the purposes of illustration, it is to be understood that all alterations, equivalents and modifications within the spirit and scope of the present invention are herein meant to be included.

I claim as my invention:

1. A circuit for detecting the difference in frequency of two pulse trains comprising, in combination; input means for each pulse train, monostable means operably connected to said input means for providing a rectangular pulse for each pulse in each pulse train; differentiating means for providing a pulse signal when each rectangular pulse ceases; output means responsive to each pulse signal when enabled for providing an output signal; flip-flop means for enabling said output means in accordance with the last received pulse by said input means; and means responsive to coincident pulses at said input means for disabling said flip-flop means and said output means.

2. A circuit for detecting the difference in frequency of two pulse trains comprising, in combination; input means for each pulse train; monostable means operably connected to said input means for providing a rectangular pulse for each pulse in each pulse train; differentiating means for providing a pulse signal of one polarity when said rectangular pulse commences and a pulse signal of opposite polarity when said rectangular pulse ceases; output means responsive to each pulse signal of opposite polarity when enabled for providing an output signal; flip-flop means for enabling said output means in accordance with the last received pulse by said input means; and means responsive to coincident pulses at said input means for disabling said output means.

3. The circuit of claim 2 wherein said last-mentioned means includes differentiating means for providing a signal of said one polarity when said rectangular pulse commences, and monostable means for disabling said output means for a time period greater than the time length of said rectangular pulse.

4. A circuit for detecting the difference in frequency of two pulse trains comprising, in combination; input means for each pulse train; monostable means operably connected to said input means for providing a rectangular pulse of predetermined time duration for each pulse in each pulse train; differentiating means for providing a pulse signal of one polarity when said rectangular pulse commences and a pulse signal of opposite polarity when said rectangular pulse ceases; output means responsive to each said pulse signal of opposite polarity when enabled for providing an output signal; flip-flop means for enabling said output means in accordance with the last received pulse by said input means; and monostable disabling means responsive to coincident pulses at said input means for providing a disabling signal to said flip-flop means and said output means of longer duration than said predetermined time duration.

5. A circuit for detecting the difference in frequency of two pulse trains comprising, in combination; first input means for the first pulse train; first monostable circuit means responsive to each pulse of said first pulse train for providing a first rectangular pulse; first means for providing a first pulse signal each time the monostable means ceases a rectangular pulse; first output means responsive to said first pulse signal when enabled for providing an output signal; second input means for the second pulse train; second monostable means responsive to each pulse of said second pulse train for providing a second rectangular pulse; second means for providing a second pulse signal each time the monostable means ceases said second rectangular pulse; second output means responsive to said second pulse signal when enabled for providing an output signal; flip-flop means operably connected to said first monostable means and said second monostable means for selectively enabling said first and second output means in accordance with the pulse last received at either said first and second monostable circuit means; and means for disabling said flip-flop means and each said output means for a time period greater than the duration of any said rectangular pulse when a pulse from each pulse train appears simultaneously at both input means.

6. The circuit of claim 5 wherein said first means and said second means includes differentiating means for providing a pulse signal of one polarity when said associated rectangular pulse commences and a pulse signal of opposite polarity when said associated rectangular pulse ceases, and clipper means for blocking each said pulse signal of said one polarity from said associated output means.

7. The circuit of claim 5 wherein said means for disabling includes additional differentiating means operably connected to said first monostable circuit means and said second monostable circuit means for providing a pulse signal of said opposite polarity when each said rectangular pulse commences, and third monostable circuit means responsive to the coincidence of said signals of said opposite polarity for disabling said flip-flop means and said first and said second output means for a time greater than the duration of rectangular pulse from said first and from said second monostable circuit means.

8. A circuit for detecting the difference in frequency of two pulse trains comprising, in combination; first monostable means having a stable state and an unstable state and responsive to each pulse of the first pulse train for assuming an unstable state; first means for providing a first pulse signal each time the monostable means returns to said stable state; first output means responsive to said first pulse signal when enabled for providing an output signal; second monostable circuit means having a stable state and an unstable state and responsive to each pulse of the second pulse train for assuming an unstable state; second means for providing a second pulse signal each time the monostable means returns to said stable state; second output means responsive to said second pulse signal when enabled for providing an output signal; flip-flop means for enabling said first output means when the last received pulse signal is from said first means and for enabling said second output means when the last received pulse signal is from said second means; and means responsive to both of said pulse trains for disabling said flip-flop means and each said output means for a time period greater than the duration of the unstable state of each monostable circuit means when an input pulse appears simultaneously at both monostable circuit means.

References Cited by the Examiner

UNITED STATES PATENTS

| | | | |
|---|---|---|---|
| 2,636,133 | 4/1953 | Hussey | 307—88.5 |
| 2,650,359 | 8/1953 | Brockway et al. | 332—20 |
| 2,795,695 | 6/1957 | Raynsford | 328—133 |
| 2,931,951 | 4/1960 | Schabuer | 328—55 |
| 3,005,165 | 10/1961 | Lenigan | 328—127 |

ARTHUR GAUSS, *Primary Examiner.*

JOHN W. HUCKERT, *Examiner.*